US011916345B2

(12) United States Patent
Böcker et al.

(10) Patent No.: US 11,916,345 B2
(45) Date of Patent: Feb. 27, 2024

(54) CONNECTION TERMINAL FOR CONDUCTORS

(71) Applicant: Weidmüller Interface GmbH & Co. KG, Detmold (DE)

(72) Inventors: Marc Böcker, Steinheim (DE); Ralf Schumacher, Lemgo (DE); Karlo Stjepanovic, Bielefeld (DE); Walter Hanning, Detmold (DE); Till Schmitz, Detmold (DE); Stefan Aporius, Detmold (DE); Jens Oesterhaus, Detmold (DE)

(73) Assignee: Weidmüller Interface GmbH & Co. KG (DE)

( * ) Notice: Subject to any disclaimer, the term of this patent is extended or adjusted under 35 U.S.C. 154(b) by 70 days.

(21) Appl. No.: 17/634,737

(22) PCT Filed: Sep. 2, 2020

(86) PCT No.: PCT/EP2020/074456

§ 371 (c)(1),
(2) Date: Feb. 11, 2022

(87) PCT Pub. No.: WO2021/047974

PCT Pub. Date: Mar. 18, 2021

(65) Prior Publication Data

US 2022/0320759 A1 Oct. 6, 2022

(30) Foreign Application Priority Data

Sep. 13, 2019 (DE) ......................... 202019105075.6

(51) Int. Cl.
*H01R 4/48* (2006.01)

(52) U.S. Cl.
CPC ................................ *H01R 4/48365* (2023.08)

(58) Field of Classification Search
CPC .................................................... H01R 4/4836
See application file for complete search history.

(56) References Cited

U.S. PATENT DOCUMENTS 9,397,444 B1 * 7/2016 Wu ...................... H01R 4/4836
10,658,766 B2 * 5/2020 Herrmann ............ H01R 4/4836
2021/0057830 A1 2/2021 Fehling et al.

FOREIGN PATENT DOCUMENTS

DE 1213024 B 3/1966
DE 3019149 A1 11/1981
(Continued)

*Primary Examiner* — Ross N Gushi
(74) *Attorney, Agent, or Firm* — Laubscher & Frewell, P.C.

(57) ABSTRACT

A connection terminal for connecting a conductor is formed as a direct plug-in terminal and includes a clamping spring arranged in a housing. The clamping spring includes a resilient clamping leg which can move into an open and locking position by pressing down an actuating device. The housing contains a conductor insertion channel for insertion of the conductor into a clamping point between the free end of the clamping leg and a busbar. The actuating device includes a pressing element and a pivoting element which interacts with the pressing element at least when the clamping point is being opened. At least one release device is provided for releasing the locking state of the clamping leg of the clamping spring. The release device is designed in such a way that the locking position can be released again by the action of the conductor on the release device when it is inserted, wherein the pivoting element acts on the pressing element and the pressing element acts on the clamping leg.

19 Claims, 26 Drawing Sheets

(56) References Cited

FOREIGN PATENT DOCUMENTS

| | | | |
|---|---|---|---|
| DE | 102004001202 | A1 | 7/2004 |
| DE | 202015103176 | U1 | 6/2015 |
| DE | 102015118574 | A1 | 5/2017 |
| DE | 102017121543 | A1 | 3/2019 |
| DE | 202019101246 | U1 | 6/2019 |
| EP | 2768079 | A1 | 8/2014 |
| EP | 2947718 | A1 | 11/2015 |
| WO | 2017207429 | A2 | 12/2017 |

* cited by examiner

CONNECTION TERMINAL FOR CONDUCTORS

This application is a § 371 National Stage Entry of PCT/EP2020/074456 filed Sep. 2, 2020. PCT/EP2020/074456 claims priority of DE 20 2019 1050756 filed Sep. 13, 2019. The entire content of these applications is incorporated herein by reference.

BACKGROUND OF THE INVENTION

It is known from DE 10 2004 001 202 A1 to release a clamping spring which is locked in an open state from the locking position with a pivoting lever so that the clamping spring can relax and press a conductor, which can be inserted into a clamping point, against a busbar in order to contact the conductor end. Restoring the locking state can be carried out with a screwdriver, for example.

In addition, it is known from DE 30 19 149 A1 to release direct plug-in terminals from the locking position with a clamping spring that is locked in an open state with a conductor end so that the clamping spring can relax in order to contact the conductor end. Restoring the locking state can take place with a pivoting element which is arranged externally on the clamping housing.

In EP 2 768 079 it is proposed to release a direct plug-in terminal which is locked in the open state from the locking state with a pressing element that is arranged between the clamping spring and the conductor.

From WO 2017/207 429 A2 it is further known to be able to release the locking state of a direct plug-in terminal with a clamping spring from the locking state with two different adjustment devices, wherein one of the adjustment devices can be formed as a rocker that can be actuated via a free conductor end and the other adjustment devices can be formed as a pressing element. Restoring the locking state takes place with the pressing element.

The present invention was developed to provide a further advantageous solution for restoring the locking state of a connection terminal that is configured as a direct plug-in terminal with a clamping spring that can be locked in an open state.

SUMMARY OF THE INVENTION

Accordingly, it is a primary object of the invention to provide a connection terminal for connecting a conductor which is formed as a direct plug-in terminal with a clamping spring arranged in a housing. The clamping spring includes a resilient clamping leg which is moved by an actuating device into an open and locking position for the insertion of a conductor. The housing has a conductor insertion channel for insertion of the conductor into a clamping point between the free end of the clamping leg of the clamping spring and a busbar. The actuating device has a pressing element and a pivoting element which interacts with the pressing element at least when the clamping point is being opened. There is further provided at least one release device for releasing the locking state. The release device is designed in such a way that the locking position can be released again by the action of the conductor on the release device when it is inserted. Since the actuating device has both a pressing element and a pivoting element, the pivoting element can be used to vary both the direction of actuation when tensioning the spring and the required force in a simple manner by designing the pivoting element accordingly. Locking the clamping spring in the open state is an advantageous option. This is accomplished by forming the pivoting element to act on the pressing element and to form the pressing element to act on the clamping leg.

In one embodiment, a second release device designed differently from the first release device is provided for releasing the locking state.

According to a further embodiment, the pressing element is linearly or substantially linearly movable in an actuation channel of the housing which extends parallel to the conductor insertion channel.

The pressing element can be locked in a locking position in which it holds the clamping leg in the open position for insertion of the conductor.

In addition, the pivoting element is preferably though not necessarily arranged in the actuation channel in front of the pressing element in the conductor insertion direction. Alternatively, however, the pivoting element is arranged in the actuation channel behind or beside the pressing element in the conductor insertion direction.

For simple actuation, the pivoting element is formed as a pivoting lever which is pivotably mounted in or on the housing and which has a pressing arm with which it acts on the pressing element and an actuating arm for manual or tool-operable movement of the pivoting lever.

On the one hand, the pivoting element is pivotably mounted on the housing with a pivot bearing with a fixed axis of rotation. Alternatively, the pivoting element is pivotably mounted on the housing via a pivot bearing with an axis of rotation that moves in a translatory manner (in one to 3 spatial directions in succession or simultaneously) in space when the pivoting element is pivoted. In this way, the space requirement of the pivoting element during the rotary movement can be optimized in accordance with the respective installation space dimensions.

According to a further embodiment, the pivoting element is arranged completely or partially in the actuation channel, in particular pivotably mounted in the actuation channel.

In addition, the pivoting element rests substantially and is pivotably mounted externally on the housing.

In this case, the pressing arm rests freely on the actuating element without coupling so that the pivoting lever can press the pressing element into an open and locking position but can be pivoted back without affecting the pressing element.

The pivoting lever is coupled to the pressing element via a coupling device so that the pivoting lever can press the pressing element into an open and locking position and so that it can be moved back together with the pivoting lever.

The pivoting element is configured to serve as an indication element from the position of which it can be seen whether the clamping leg of the clamping spring is in the open or in the clamping state.

In addition, the connection terminal has a further release element for releasing the locking state of the clamping leg of the clamping spring.

According to another embodiment, a direct plug-in connection terminal for connecting a conductor includes a clamping spring arranged in a housing and having a resilient clamping leg which can move into an open and locking position. An actuating device presses the clamping leg down into the open and locking position for the insertion of a conductor. The housing has a conductor insertion channel for insertion of the conductor into a clamping point between the free end of the clamping leg and a busbar. The actuating device has a pressing element and a pivoting element which interacts with the pressing element at least when the clamping point is being opened. The clamping spring is supported in the housing and is not connected to the busbar. The busbar has a flat surface in the region of the conductor insertion and the conductor is guided through the housing and the clamping spring when it is inserted into the clamping point. In this way, the locking state of the direct plug-in terminal can be restored.

According to a further embodiment, a terminal block is provided having one or more connection terminals constructed in a disc-like manner and arranged in a row as well as a plug connector or a printed circuit board terminal.

BRIEF DESCRIPTION OF THE FIGURES

Other objects and advantages of the invention will become apparent from a study of the following description when viewed in the light of the accompanying drawing, in which.

DETAILED DESCRIPTION

Figure 1:
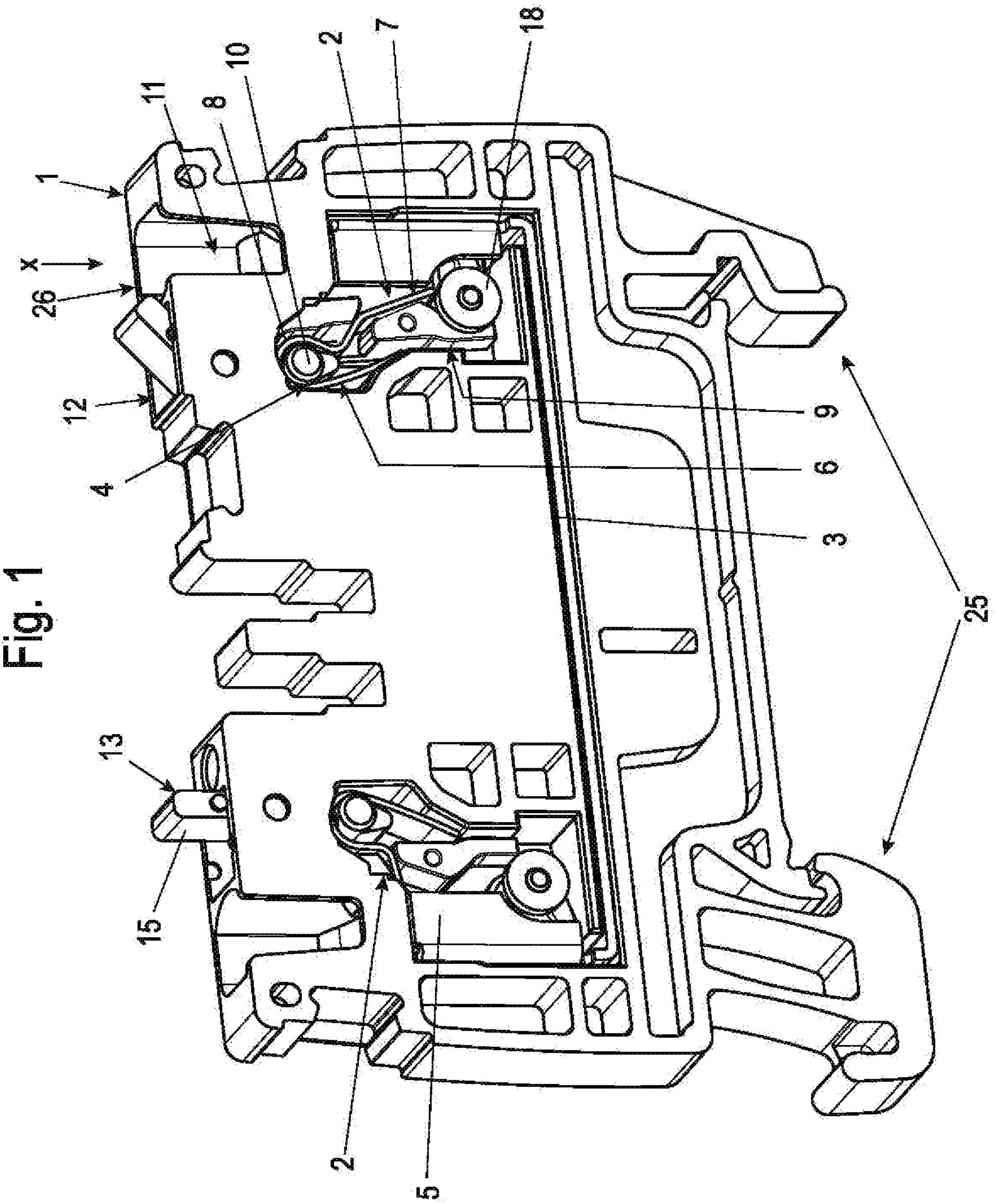
FIG. 1 is a front perspective view of a terminal block with two connection terminals which are formed as direct plug-in terminals.

FIG. 1 shows a housing 1 of a connection terminal 2. This housing 1 is formed as the housing 1 of a terminal block in which two the connection terminals 2 are formed.

The housing 1 could alternatively be formed as the housing 1 of another apparatus, for instance as the housing of a plug connector or the like as shown for example in FIGS. 5*a*-5*g*.

In addition, the housing 1 could have only a single connection terminal 2 or more than two of the connection terminals 2.

The connection terminal 2 is suitable or designed for connecting a free conductor end of a conductor (not shown)—for example a conductor stripped of insulation in the end region.

The structure of the two connection terminals 2, which are formed identically, is described in more detail hereinbelow. The two connection terminals 2 can be conductive, for example connected to one another via a busbar section 3. The two connection terminals could also be constructed differently, e.g. one could be designed as a direct plug-in terminal of the type depicted and the other as a connection terminal of a different design.

The connection terminals 2 in all the figures have a clamping spring 4 and a busbar 5. The clamping spring 4 can be used to press a free—e.g. stripped—conductor end of a solid or stranded conductor against the busbar 5 in order to be able to conductively connect the conductor end and the busbar 5 to one another. This position shown in FIG. 1 of the left-hand connection terminal 2 without a conductor end being inserted into it is also referred to as the clamping position or contact position.

The respective clamping spring 4 is formed in a V shape. It has a supporting leg 6 for supporting the clamping spring 4 on an abutment, in particular on a web 9 of the housing 1, and a resiliently acting clamping leg 7, wherein these two legs 6, 7 can be connected to one another via a bend or an arc 8. In the region of the bend 8, the clamping spring 4 can be placed over a journal 10, in particular a journal 10 of the housing 1. In this way, a connection of the clamping spring to the busbar can be dispensed with. The support of the clamping spring 4 in the plastic of the housing 1 is nevertheless durable and secure. Other types of support are conceivable.

In any case, two channels 11, 12 are preferably formed in the housing 1 preferably in sections to the side of the clamping spring 4 and preferably in sections above the clamping spring 4. Here, these channels 11, 12 extend substantially or exactly parallel to a conductor insertion direction X.

One of the two channels is formed as a conductor insertion channel 11, through which a conductor end can be guided in a conductor insertion direction X into the region of a clamping point and conductor contacting point K (see FIG. 2) in the housing 1 in the region of the clamping spring at the free end of the clamping leg 7. The precise location of the conductor contacting point depends on the conductor diameter.

The other of the two channels is formed as an actuation channel 12 for moving an actuating device 13 of the connection terminal 2 in the housing 1.

The actuating device 13 preferably includes a combination of a pressing element 14 and a pivoting element 15. The pivoting element can be formed as a pivoting lever, which has two lever arms 15*a*, 15*b* which are at an angle to one another. The lever arm 15*a* is an actuating arm and the lever arm 15*b* is a pressing arm (see FIG. 2).

Figure 2:
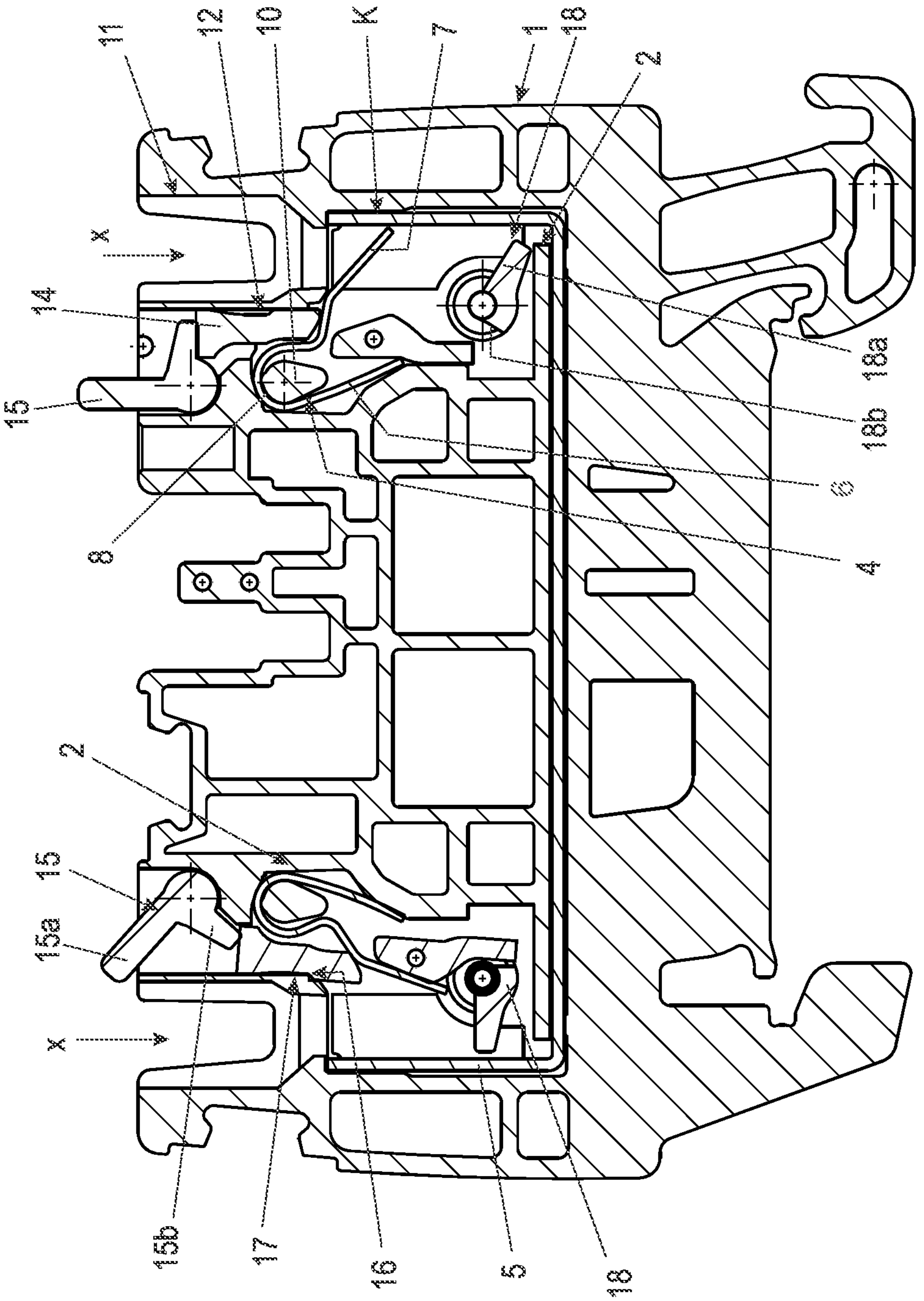
FIG. 2 is a rear sectional view of the terminal block from FIG. 1.
Figure 5A:
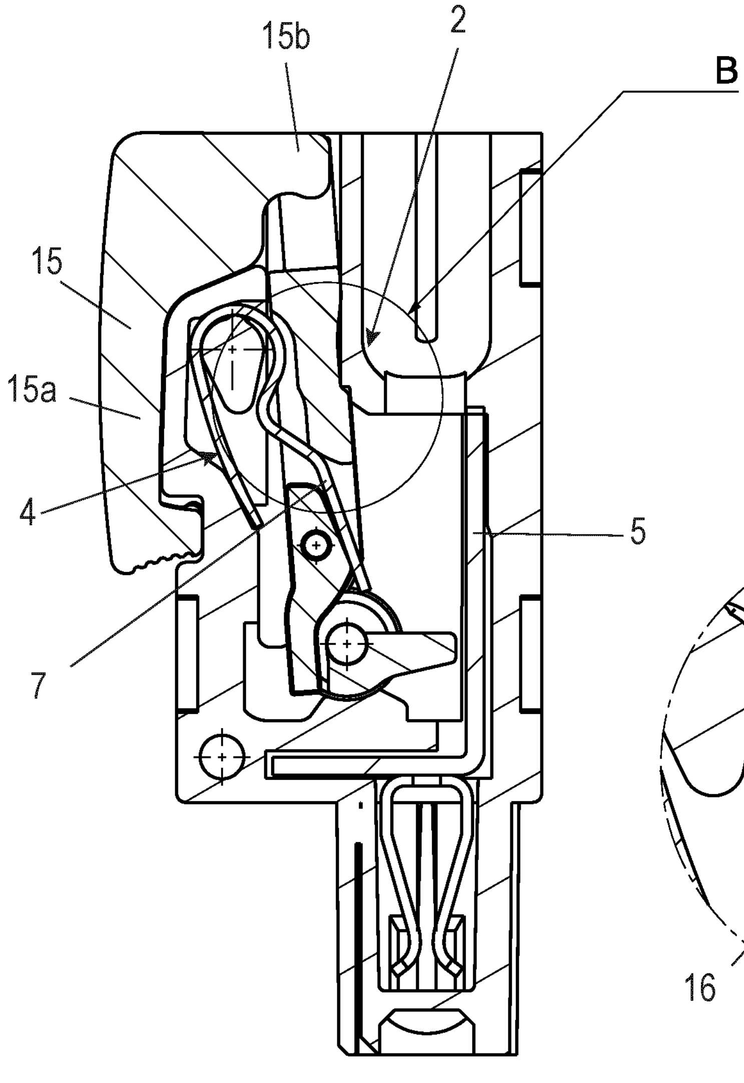
FIGS. 5*a* and 5*b* are a sectional view and an enlarged detail view, respectively of a plug connector with a fourth embodiment of a connection terminal which is formed as a direct plug-in terminal in an open locking state.
Figure 5B:
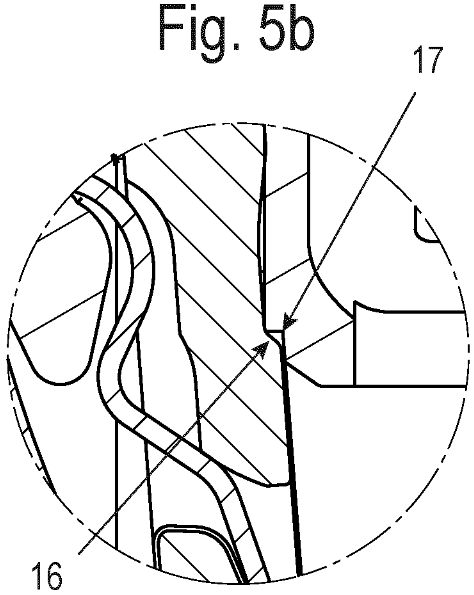
Figure 5C:
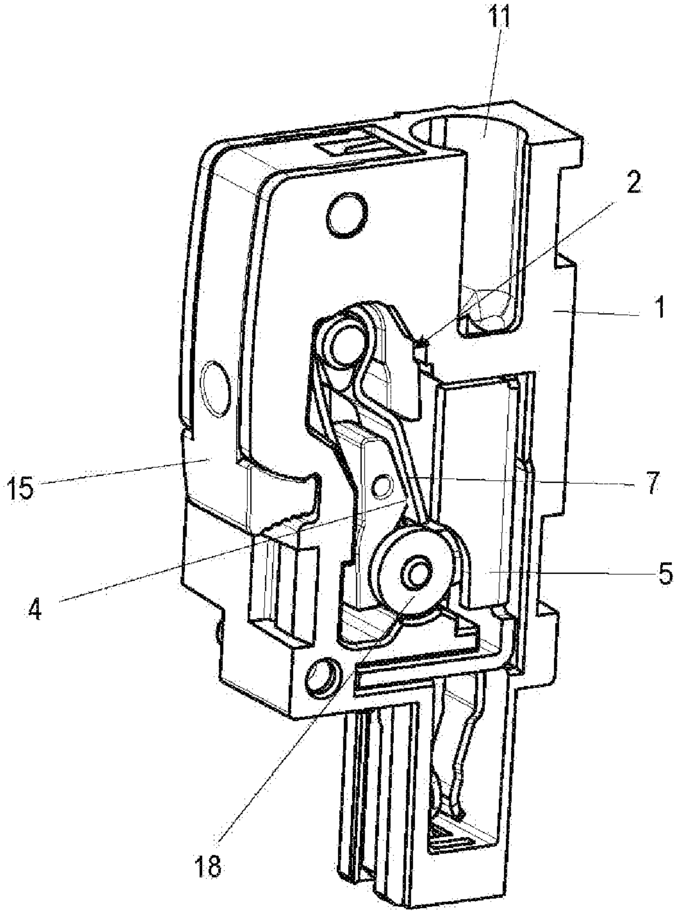
FIG. 5*c* is a perspective view of the plug connector of FIG. 5*a* in the open locking state.
Figure 5D:
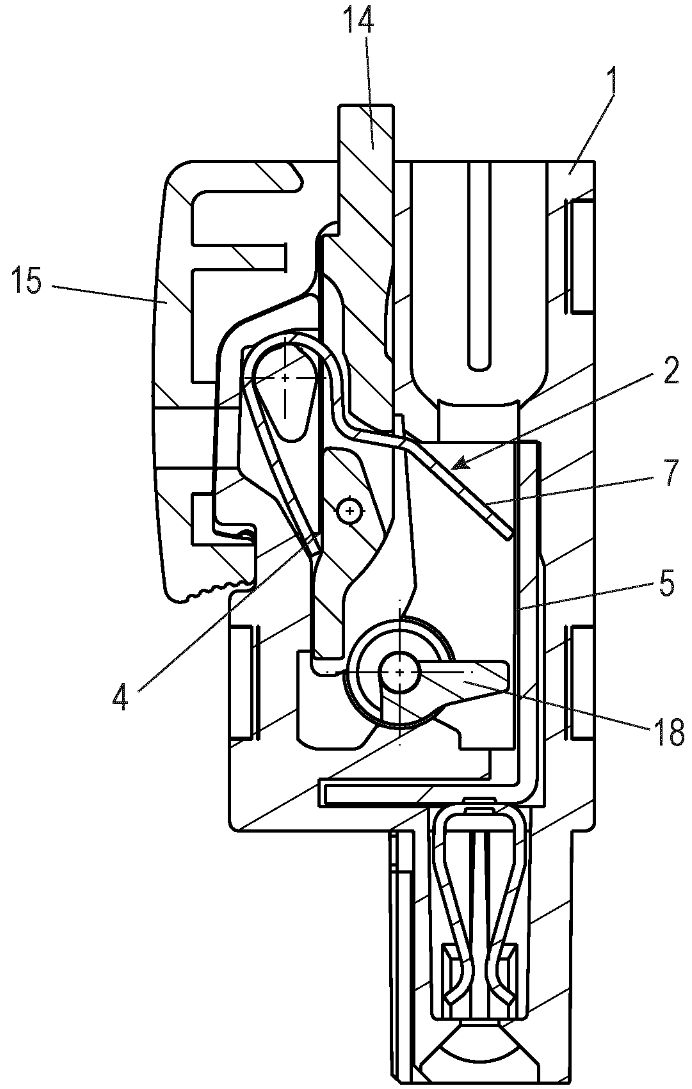
FIGS. 5*d* and 5*e* are a sectional view and a perspective view, respectively, of the plug connector of FIG. 5*a* with the connection terminal in a clamping state.
Figure 5E:
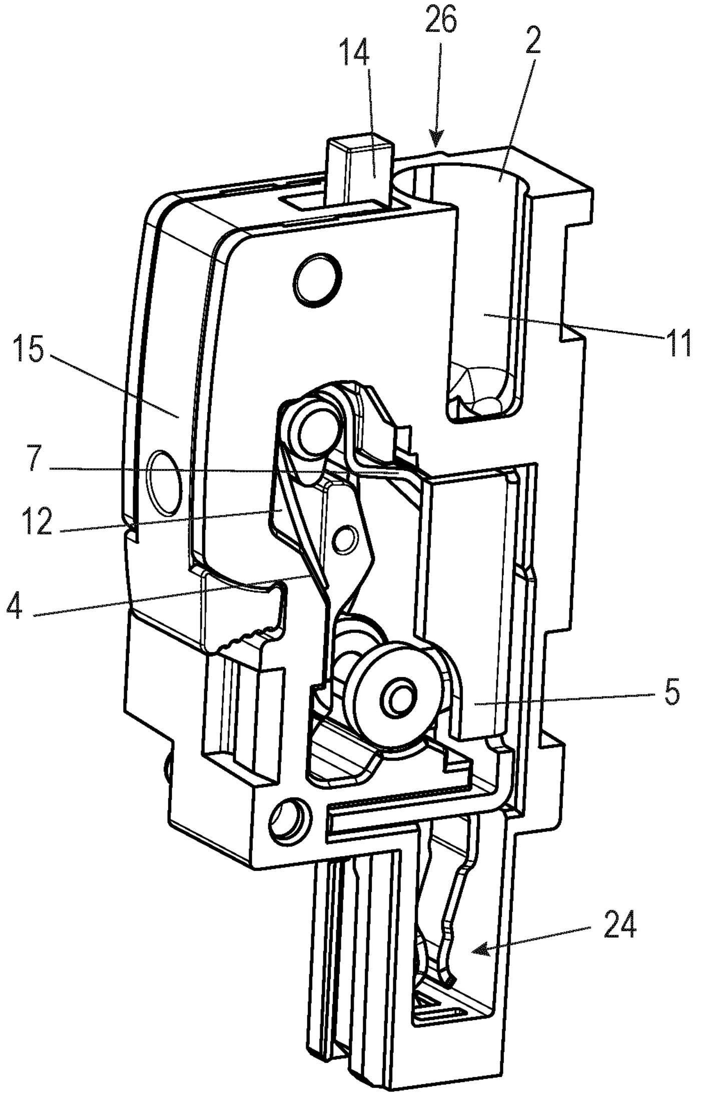
Figure 5F:
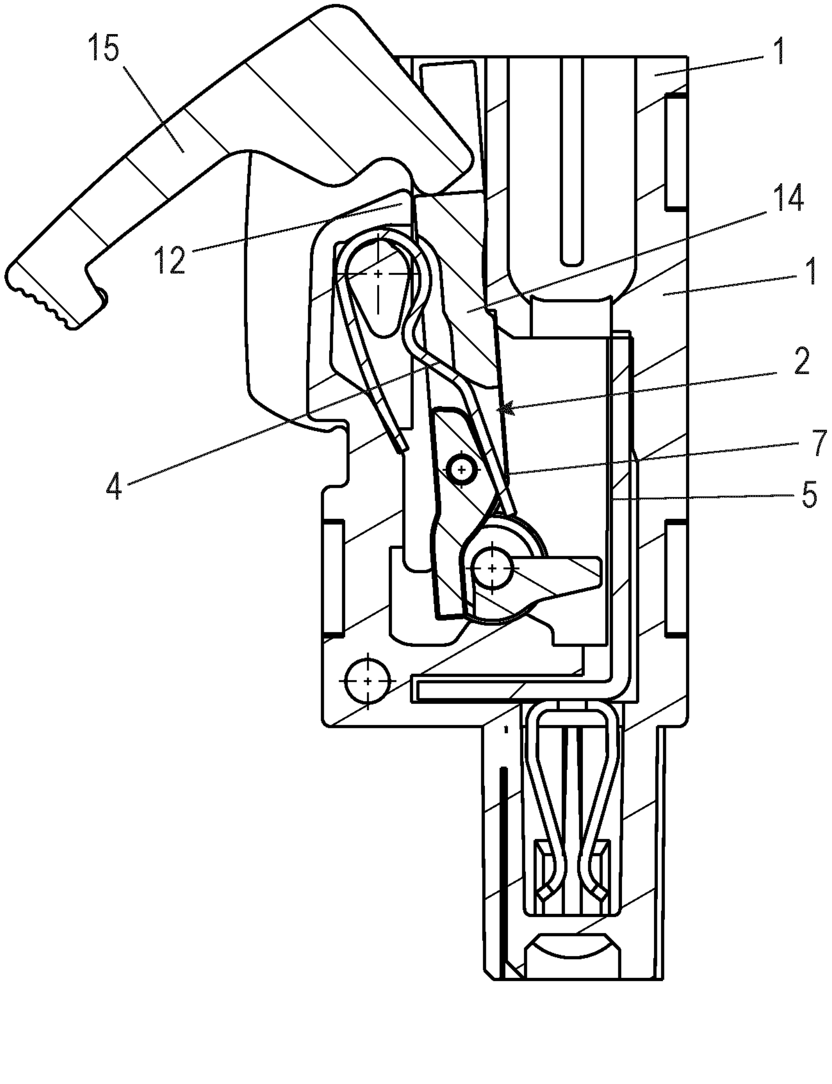
FIGS. 5*f* and 5*g* are sectional and perspective views, respectively of the plug connector of FIGS. 5*d* and 5*e*, respectively, immediately after restoring of terminal to the open locking state.
Figure 5G:
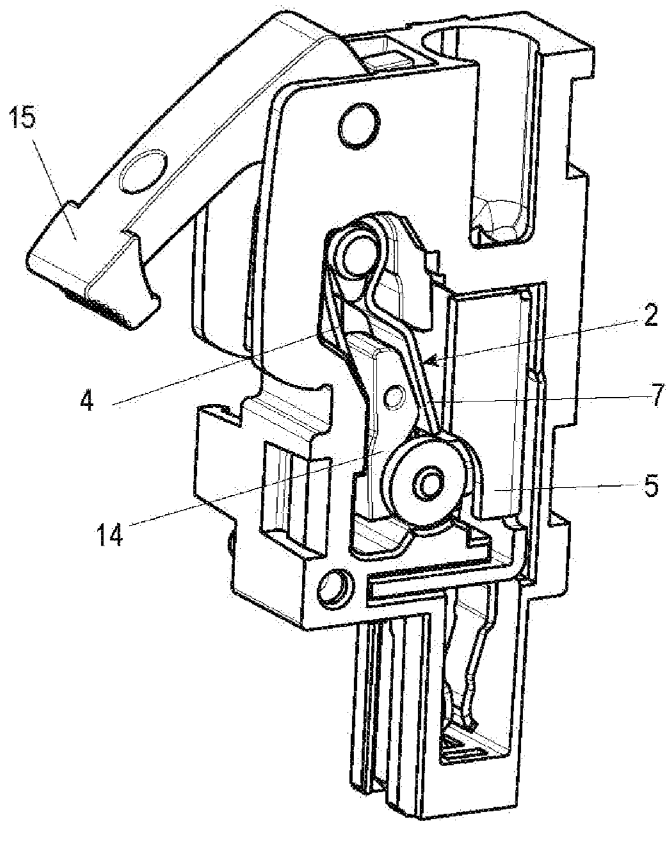

The pivoting element 15 is connected upstream of the pressing element 14 in the direction of the clamping spring 4, i.e, above the pressing element aa shown for example in FIGS. 2 and 5*f*, The pressing element 14 can be designed to act directly on the clamping leg 7 by the pressing arm 15*b*, in order to move it into an open position. The actuating arm or the lever arm 15*a* can protrude externally out of the housing 1.

Overall, the pivoting element 15 acts on the clamping leg 7 via the pressing element 14. Preferably, the pressing element 14 and the pivoting element 15 are formed as separate structural parts. These can lie loosely against one another, so that they move together in the pressing direction or conductor insertion direction X and so that they can be removed separately from one another from the region of the clamping point. This is shown in FIGS. 1 to 5.

However, the pivoting element 15 and the pressing element 14 can also be coupled to one another in such a way that they can only be moved together both in the conductor insertion direction X and counter to this direction.

The pressing element 14 can be substantially formed as a sliding element that can be moved linearly or substantially linearly in the actuation channel 12, with which sliding element pressure can be exerted on the clamping leg 7, in order to move it into an open position in which the clamping point is open, so that a conductor end can be inserted into it or between the free end of the clamping leg 7 and the busbar 5. In this case, the pressing element 14 can be moved in a predetermined position in the actuation channel 12 with a movement component at an angle to the conductor insertion direction, into a locking position, in which it is locked in the housing 1 of the connection terminal 2 on a locking edge 17 or on the busbar section 3 or the like. In this position, locked in the housing 1, it acts on the clamping leg 7 in such a way that this is pressed down so that a contacted conductor can be removed from the region of the contact and clamping point K or can be inserted into it (see also FIG. 2).

In this case, the pivoting lever 15 is designed in such a way that it can be used to exert pressure onto the pressing element 14 by pivoting—with a tool or directly by hand—in order to move the pressing element 14 substantially linearly or substantially linearly in the actuation channel 12. In this way, pressure can be exerted on the clamping leg 7 in a simple manner by pivoting the pivoting lever 15 over the pressing element 14 as an intermediate element, in order to pivot the clamping leg 7 and to open the clamping point.

Advantageously, through this arrangement locking of the clamping leg 7 in an open position can be realized. This "locking position" is characterized by the fact that the free end of the clamping leg 7 lies at a distance from the busbar 5, in such a way that a conductor end can be inserted into the region of the clamping point with as little resistance as possible. The locking position is depicted on the right in the perspective view of FIG. 1 and on the left in the rear view of FIG. 2.

According to one configuration, the locking position can be achieved by locking the pressing element 14 in a position in which the clamping leg 7 is acted on by the end of the pressing element 14 via manual or tool-supported action on the pivoting lever 15—that is to say by pivoting the same—so that the clamping leg 7 is pressed down.

If the pressing element 14 and the actuation channel 12 have corresponding locking edges 16, 17 on their sides facing one another, the pressing element 14 is pressed slightly to the side in relation to the conductor insertion direction X into a locking position at the moment when the two locking edges 16, 17 are moved axially past one another. This is depicted on the right in FIG. 1 and on the left in FIG. 2.

In an alternate embodiment, the two corresponding locking edges are not provided in the housing 1 and on the pressing element 14, but rather at a different point, for example between the pressing element 14 and the busbar 5.

It is thus possible that the pressing element 14 is locked in a predetermined axial position in the actuation channel 12 on an abutment, e.g. in the housing 1 or on the busbar section 3, so that the clamping spring or clamping leg 7 are in an open position and, due to locking of the pressing element 14 in the housing 1 or on another element, are also in a locking position in which a free conductor end can be inserted into the conductor insertion channel 11 to such an extent that, when the clamping leg 7 is released from its locking position, the clamping leg 7 presses the conductor end resiliently against the busbar 5. The busbar 5 can be bent to form a clamping cage, e.g: in an L or U shape, so that a plug-in opening for the conductor is formed in the clamping cage.

Figure 6A:
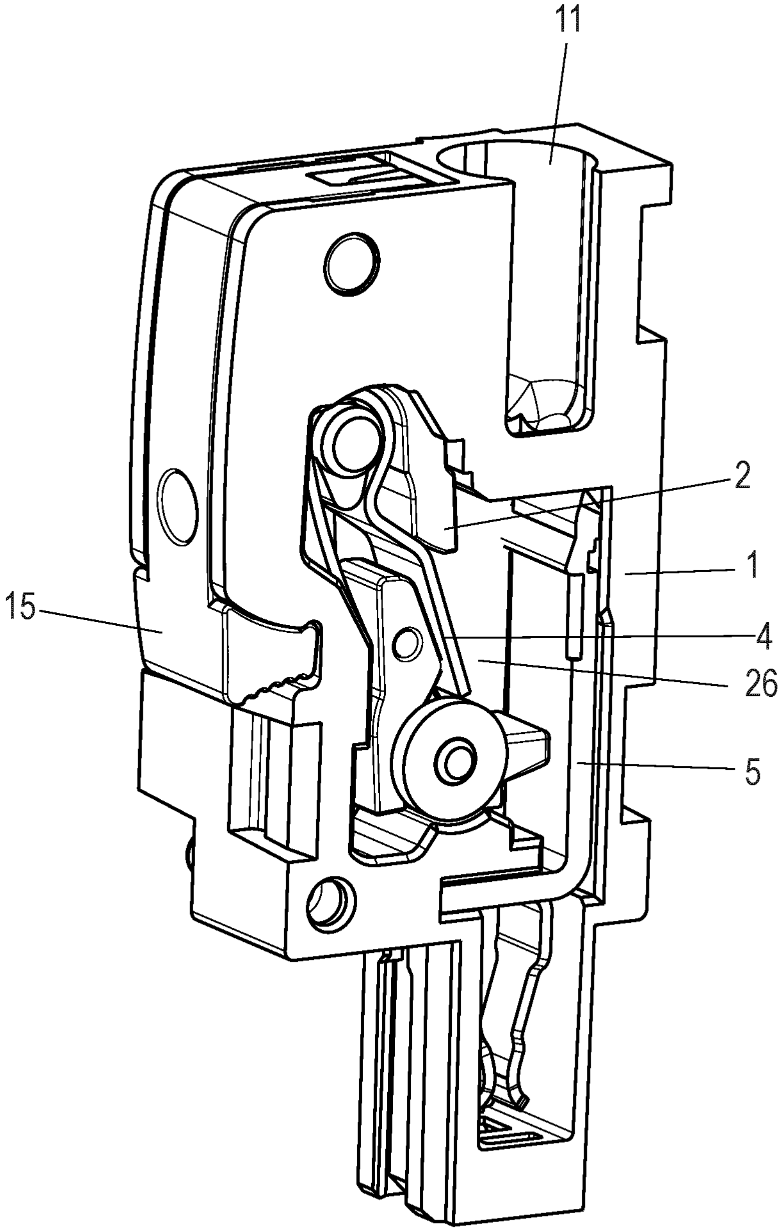
FIGS. 6*a*, 6*b*, and 6*c* are perspective views of a further plug connector in different switching states, respectively.
Figure 6B:
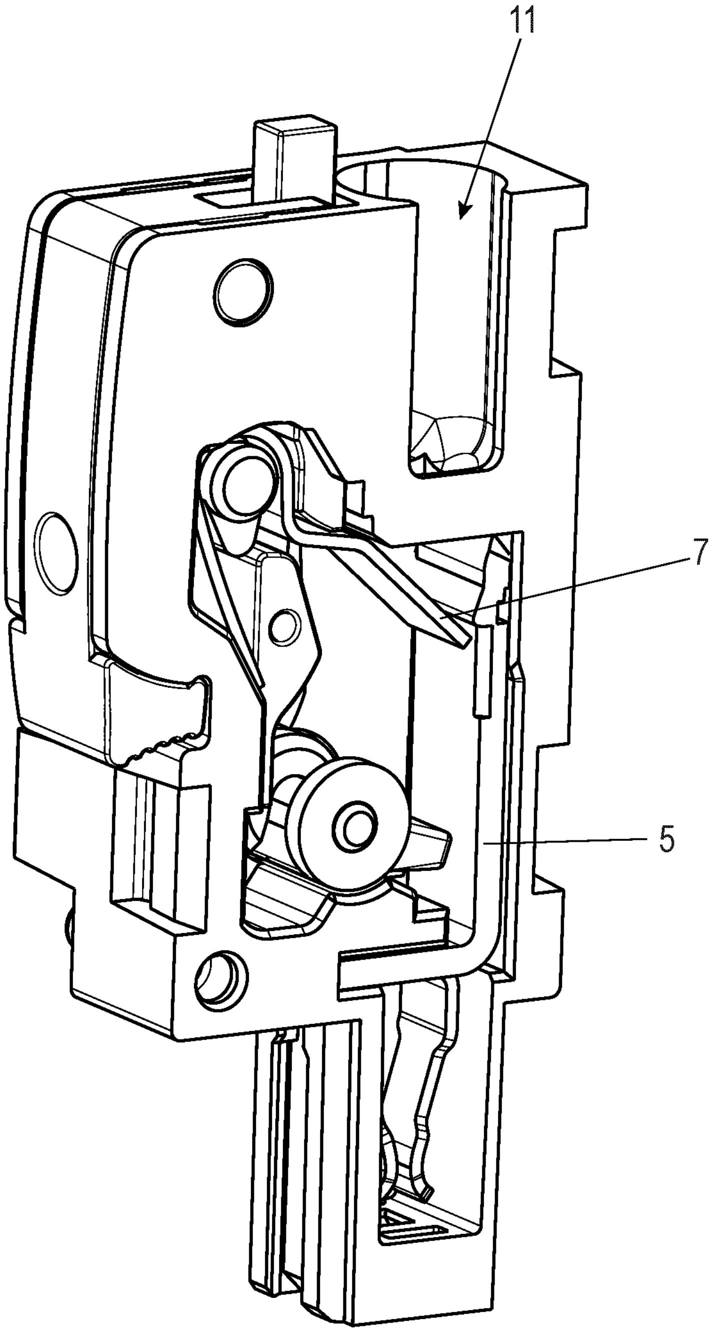
Figure 6C:
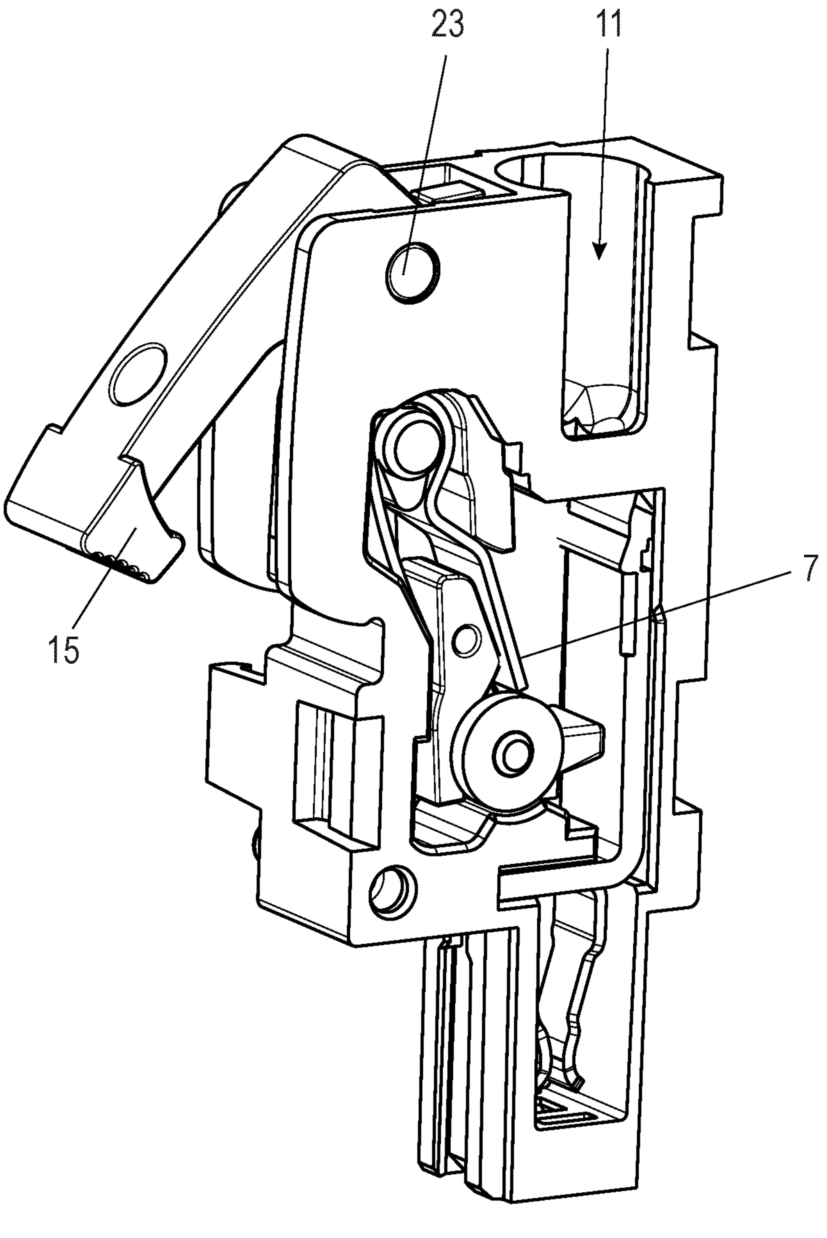

However, according to a simplified embodiment in which the busbar no longer provides protection against incorrect plugging, the busbar can be configured in such a way that it is flat over its surface, so that no clamping cage is formed as shown in FIGS. 6*a*, 6*b*, and 6*c*. Protection against incorrect plugging can then optionally be achieved by attaching a cover to the housing. Thus, the busbar 5 in the region of the conductor insertion with the adjoining conductor insertion channel 11 is formed to be substantially flat over its surface (except for a protruding clamping edge or the like) and the conductor is otherwise guided through the housing 1 and the clamping spring 4 when it is inserted into the clamping point.

The clamping spring need not be connected to the busbar. It can then be supported in the region of its arc and also with its abutment leg in the housing alone and not on a clamping cage or the busbar or the like.

According to a further option, the locking position can be released by at least one release device. This release device 18 can be formed as a pivoting element, in particular a pivoting lever, one arm 18*a* of which is arranged in the conductor insertion channel 11, for example in the conductor insertion direction "behind" or "below" the clamping point, and the other arm 18*b* of which is designed, when the release device 18 is pivoted by the action of the conductor, to move the pressing element 14—which can then extend for a corresponding length in the actuation channel 12 to behind the clamping point—back from the locking position, so that it is released from the locking position to allow the clamping leg 7 to relax and contact the inserted conductor end as shown in FIG. 2.

The operation of the two connection terminals 2 of this terminal block is simple and secure. It is advantageous that with the actuating device formed of two elements—i.e., the pivoting element 15, in particular the pivoting lever, and the pressing element 14—the actuating characteristic can be changed in comparison with actuation only via a pressing element 14.

Thus, the pivoting element 15 can have arms 15*a*, 15*b* of the same length or different lengths.

In addition, the pivoting element 15 can have shorter arms 15*a*, 15*b* (see FIGS. 1 and 2) or longer arms 15*a*, 15*b* (see FIG. 5) in order to allow manual actuation or actuation with a tool such as a screwdriver. One of the arms, arm 15*a* serves as an actuating arm that can pivot the pivoting element 15 when actuated manually or with a tool. The other of the two arms 15*b* serves to press down the pressing element 14. This is usually configured to be shorter than the longer actuating arm 15*a*.

The length of the actuating arm has a decisive effect on the magnitude of the force that must be applied to press down the pressing element 14 and to open the clamping leg 7 and move it back into the locking position.

Accordingly, the actuating arm can be configured to be shorter (FIG. 1) or longer (FIG. 5), for example to allow manual actuation or actuation with a tool, such as a screwdriver.

In addition, the direction from which actuation is to take place can also be easily varied with the pivoting element 15.

The actuating lever can be located substantially within the actuation channel 12 (see FIG. 1) and protrude only slightly beyond the edge of the terminal block. For this purpose, the actuation channel 12 (FIGS. 1 and 2) can have a larger cross-section in a region above the pressing element 14 than in the region in which the pressing element 14 is guided in a substantially displaceable manner. In this region with a larger cross-section, the pivoting element 15 can be arranged pivotably in the actuation channel 14 to form a pivot bearing with the housing 1.

The pivoting element 15 can thus be rotatably mounted in the housing 1 according to one embodiment as shown in FIGS. 1 and 2.

For this purpose, it can have journals which engage rotatably in recesses or eyes of the housing 1.

Alternatively, the pivoting element 15 can also have recesses 22 in which projections/journals 23 on the housing 1 engage rotatably as shown in FIGS. 3*a*-3*d* so that in this way a fixed pivot bearing with a fixed axis of rotation is formed.

Alternatively, it is also conceivable that the pivot bearing does not have a fixed axis of rotation.

Thus, the projection or projections 23 can move in a limited manner in a non-circular recess 22 so that the axis of rotation of the pivoting element 15 is not fixed but rather moves along a path when the pivoting element 15 pivots, so that the projection 23 is not only rotated in itself but is also moved in a translatory manner.

Figure 7A:
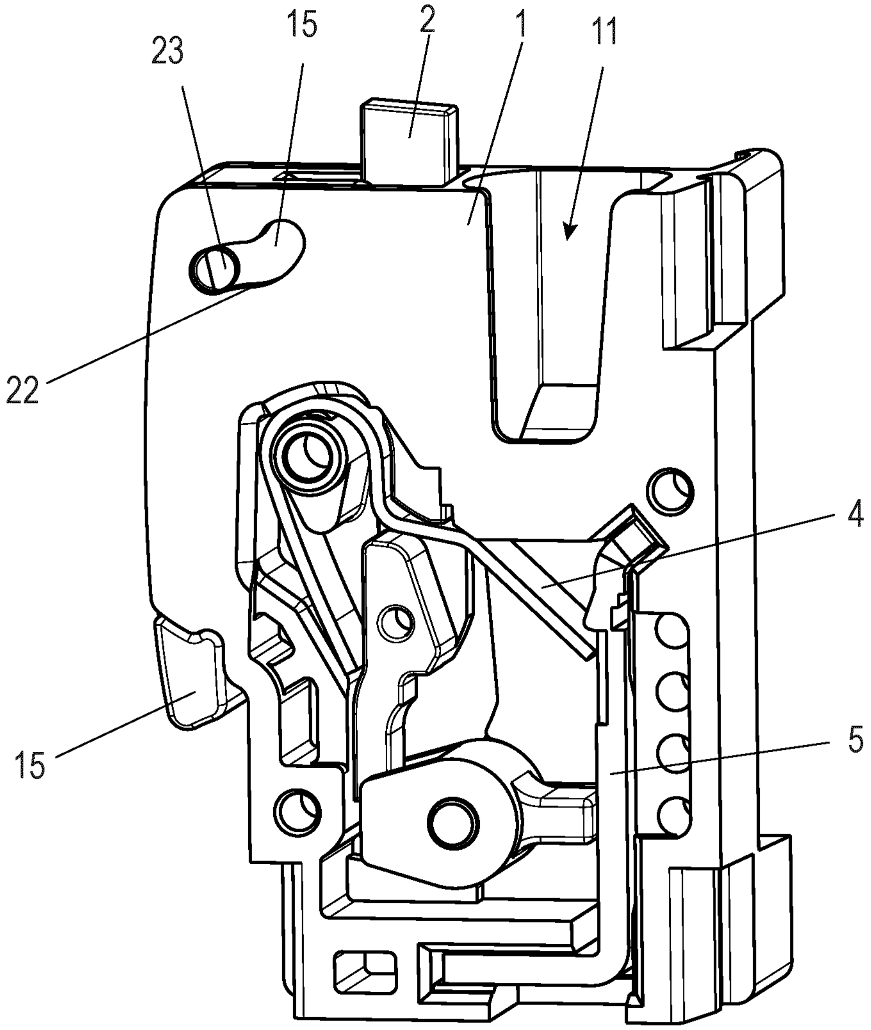
FIGS. 7*a* and 7*b*, 8*a*, and 8*b*, and 9*a* and 9*b* are perspective views of further plug connectors, respectively, in different switching states, respectively.
Figure 7B:
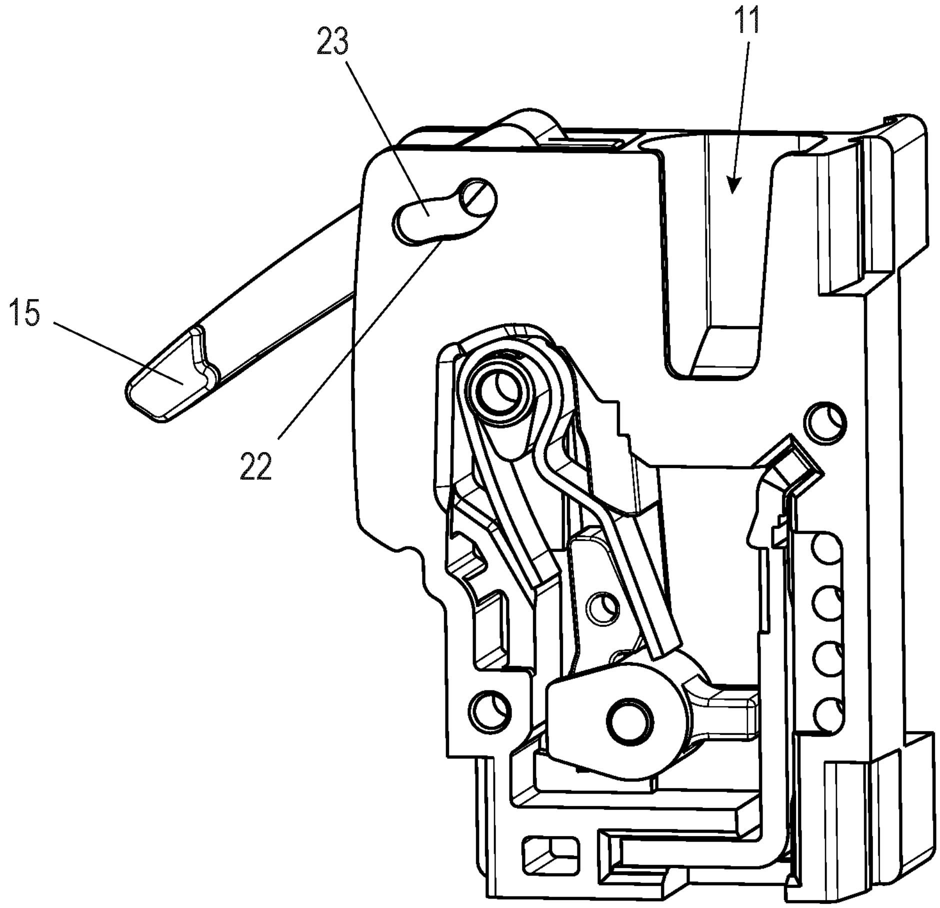

According to the embodiment shown in FIGS. 7*a* and 7*b*, the respective projection 23 can move in a slot-like as well as curve-like recess 22 when the pivoting element 15 pivots.

Figure 8A:
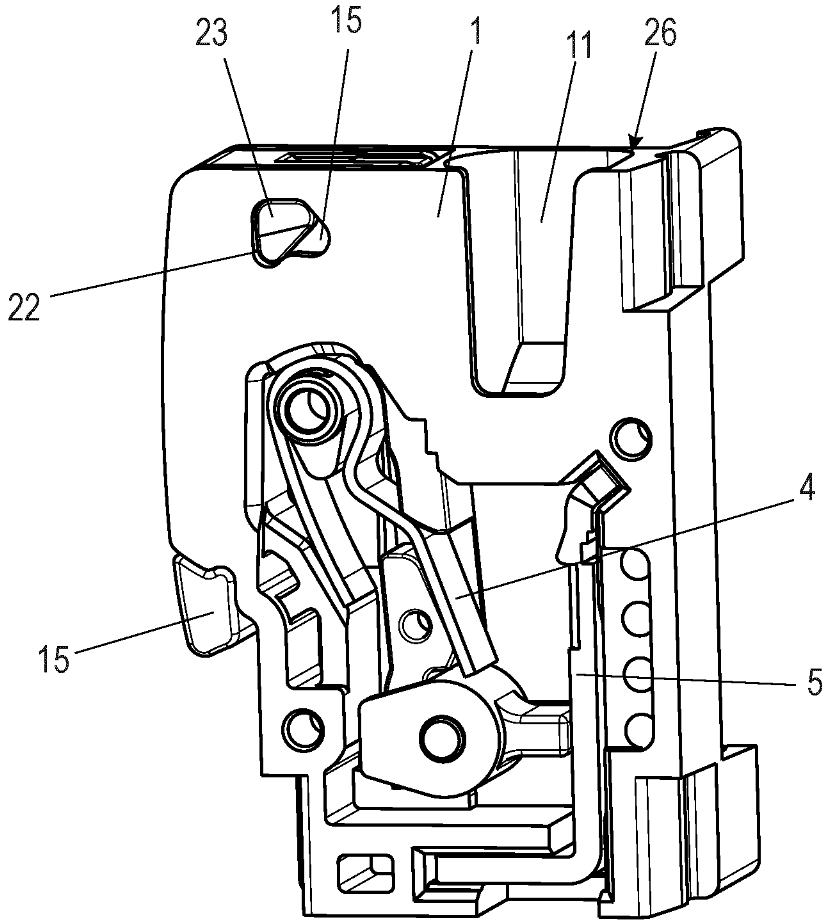
Figure 8B:
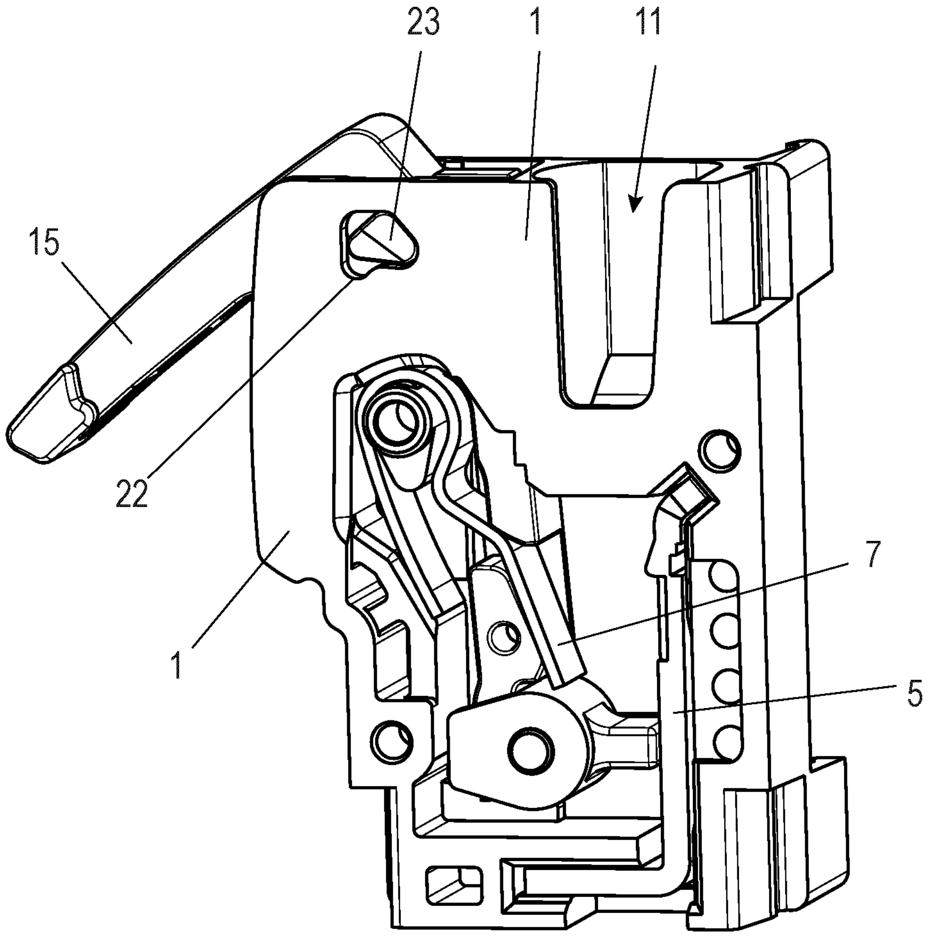
Figure 9A:
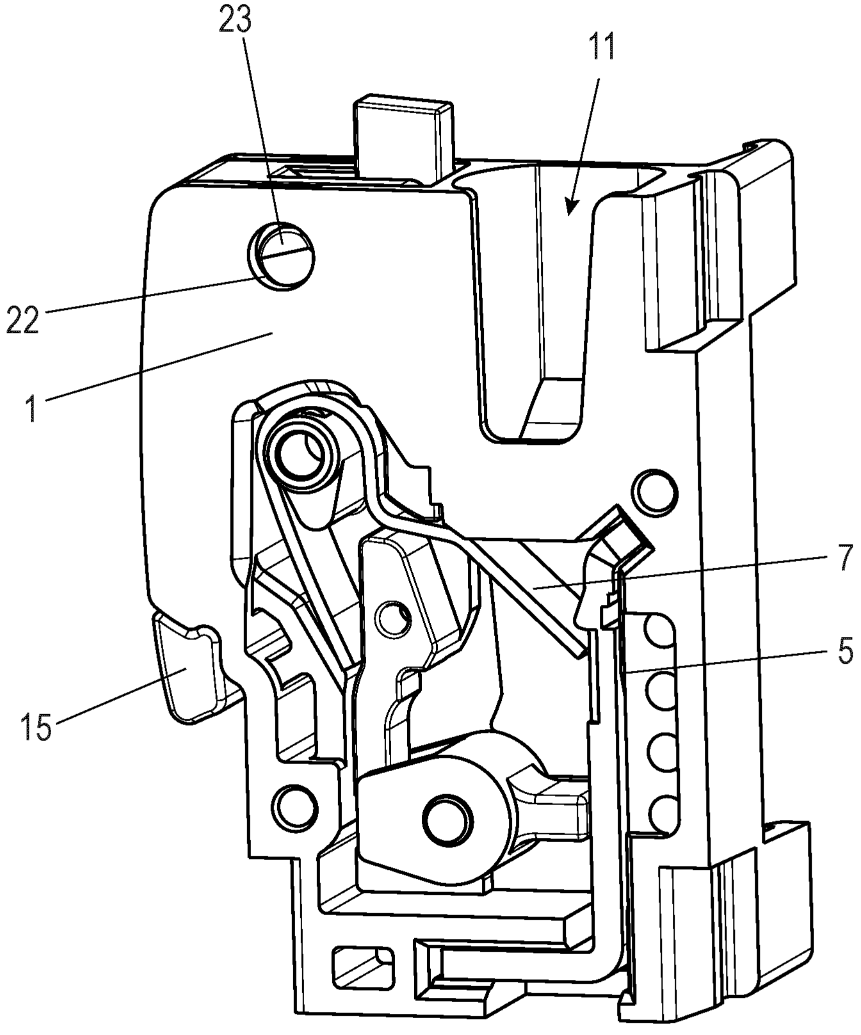
Figure 9B:
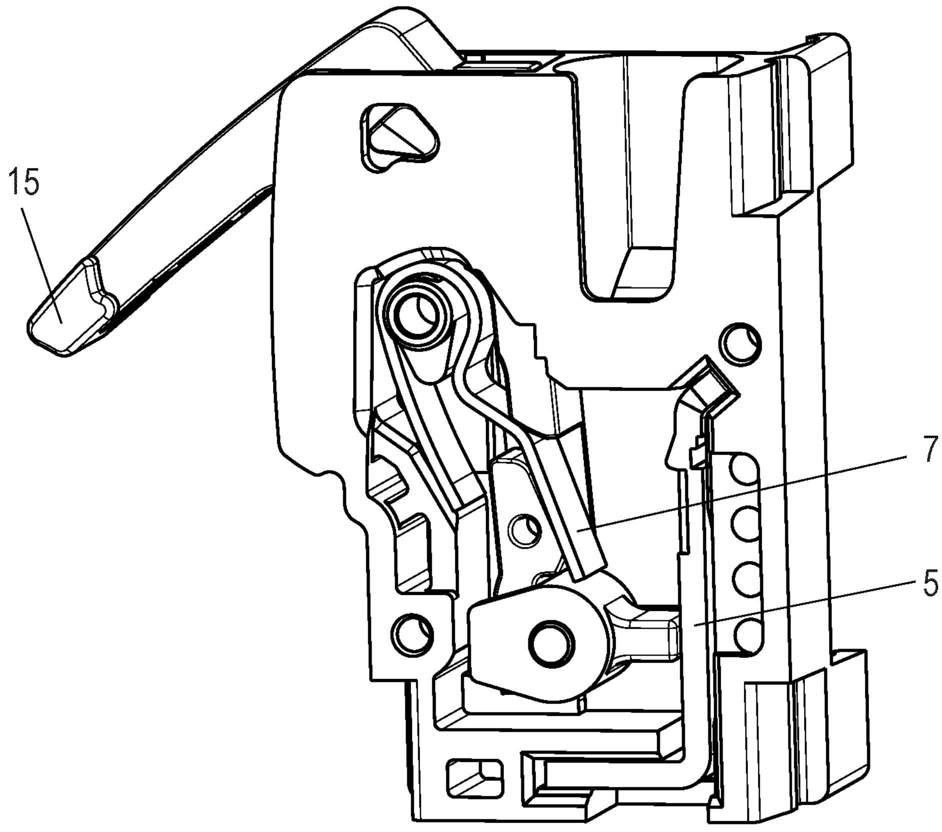

In FIGS. 9*a* and 9*b*, the recess 22 is eccentric and the projection 23 can be eccentric, and in FIGS. 8*a* and 8*b* the recess 22 is trapezoidal (polygonal) and the projection 23 is triangular.

The axis of rotation of the projection 23 then moves accordingly on a path within the recess 22 and is not fixed.

In this way, the space requirement for the pivoting element 15 during pivoting is optimized, for example reduced in one direction (e.g., to the side of the connection terminal).

Also in the configurations shown in FIGS. 7 to 9, that journals are provided which engage rotatably (not depicted) in non-circular recesses or eyes of the housing 1.

According to another embodiment such as shown in FIGS. 3*a*-3*d*, the pivoting element 15 can also rest substantially externally on the surface of the housing 1 and can be coupled to the pressing element 14 via a coupling device so that it is moved together with the latter. This coupling device can have a window 20, e.g., in the manner of an arcuate longitudinal hole, in which a pin 21 of the coupling device on the pressing element 14 engages. In this way, through the action of the edge of the window 20 (or the two windows 20), the pivoting element 15 moves the pressing element 14 on the pin or pins 21 in the conductor insertion direction X. This arrangement can also be configured kinematically in reverse.

The pivoting element 15 rests with a free end on the upper end of the pressing element 14 so that this can be pressed down by actuating the lever in order to open the spring and to be able to produce a locking state once again. When the pressing element 14 is unlocked, the clamping leg 7 is freed and moves the pressing element 14 upwards, which in turn moves the pivoting element 15 back.

According to FIGS. 3*a*-3*d*, the actuation channel 12 in the housing 1 is not formed to be open at the top in the housing 1.

Figure 3A:
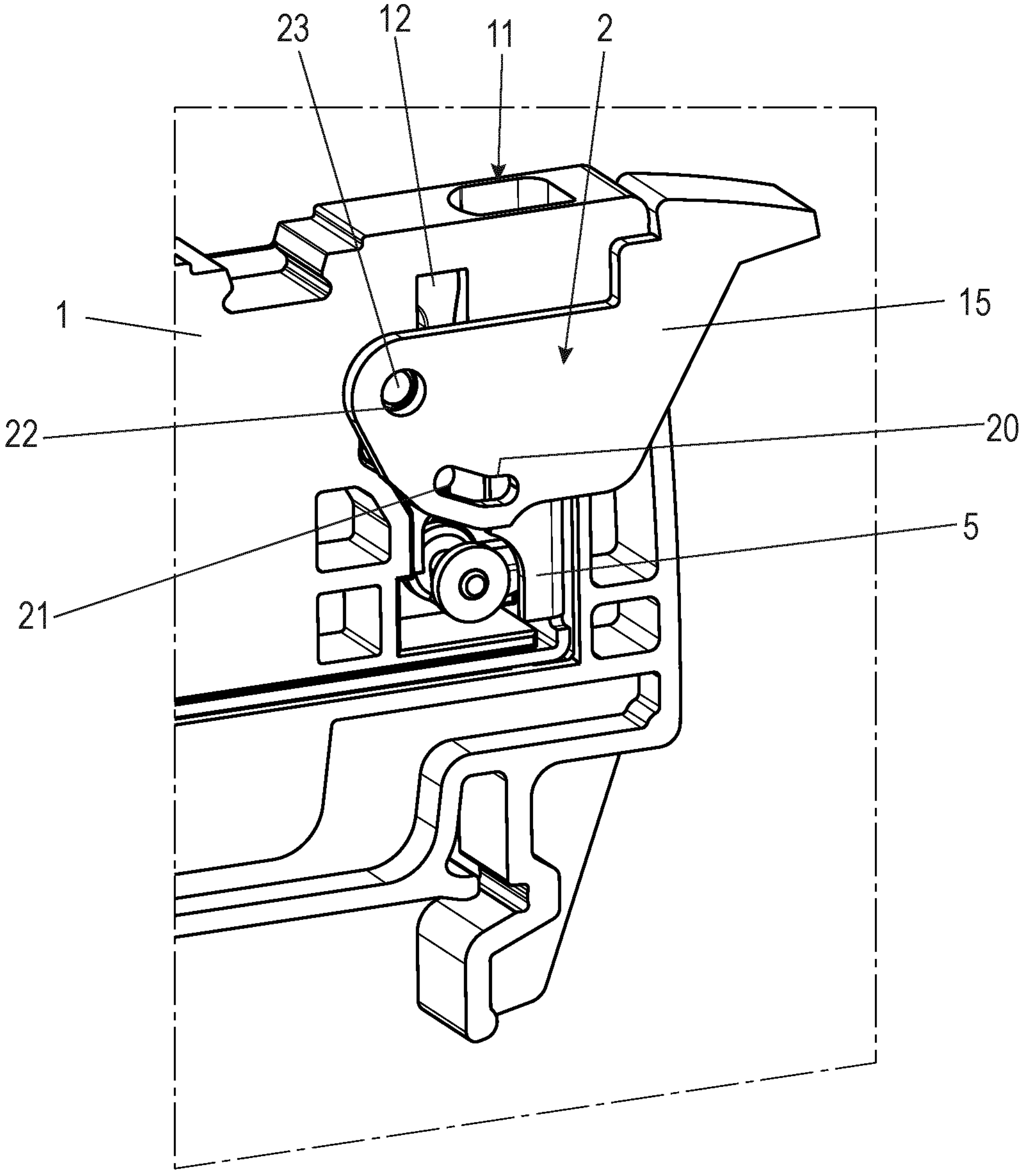
FIGS. 3*a* and 3*b* are a perspective view and a side view, respectively of a partial region of a further terminal block with a second embodiment of a connection terminal which is formed as a direct plug-in terminal in a first actuation state
Figure 3B:
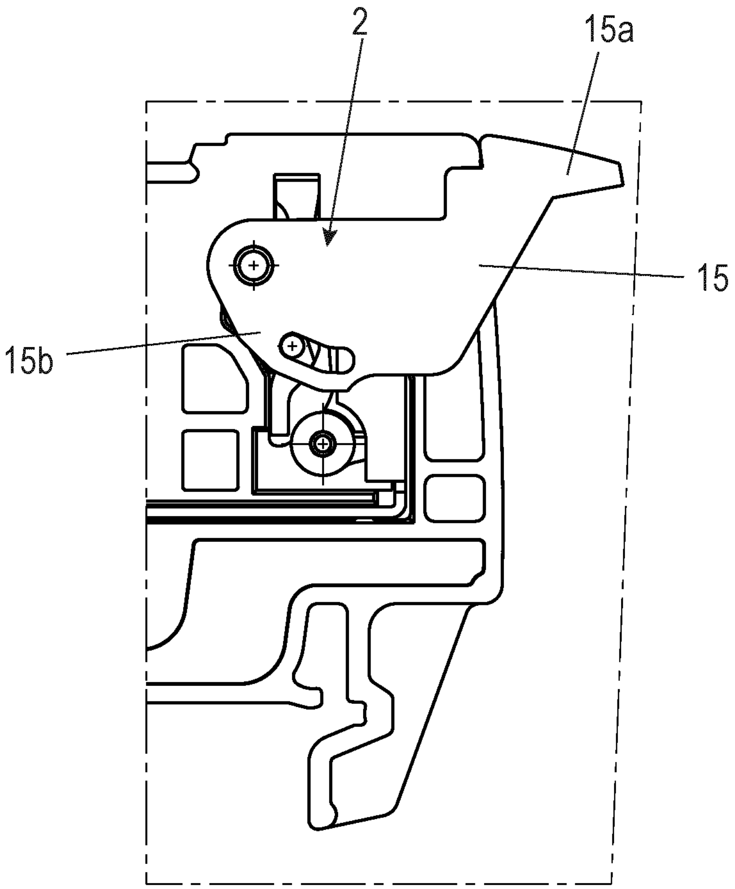
Figure 3C:
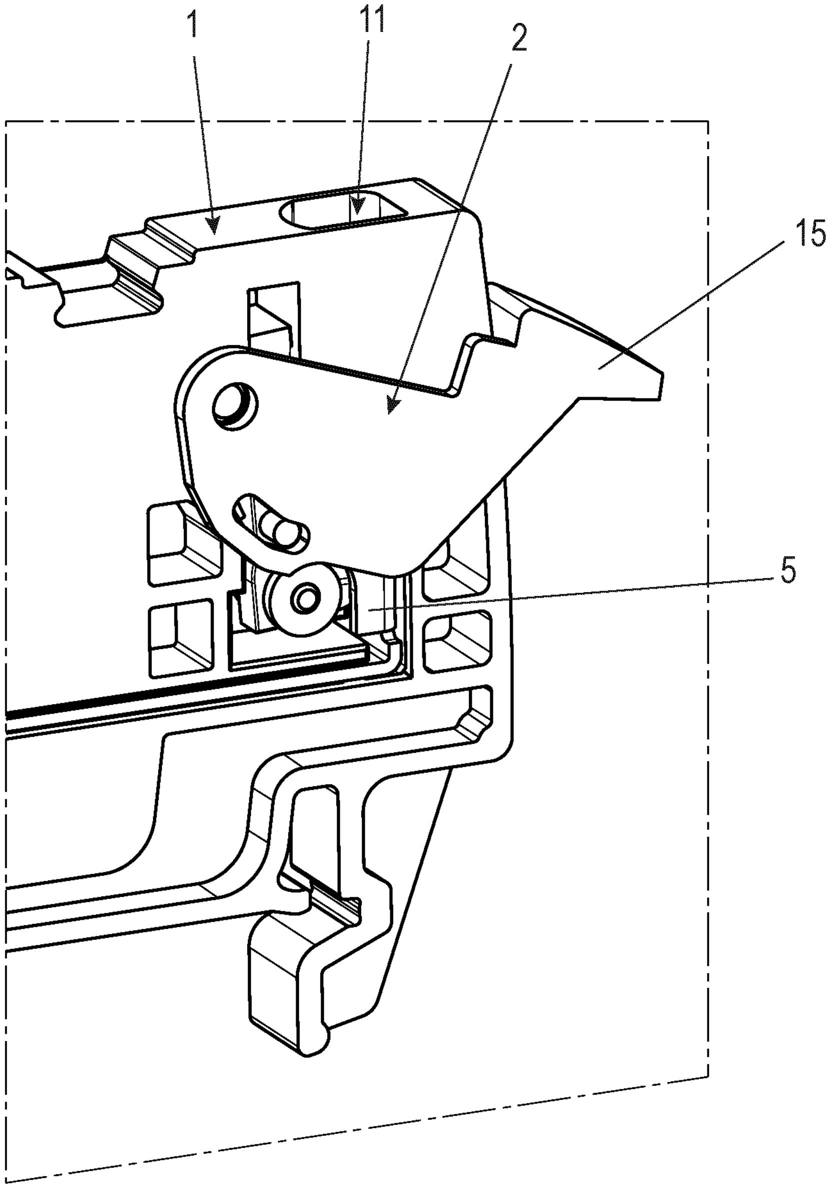
FIGS. 3*c* and 3*d* are corresponding views of the terminal block of FIGS. 3*a* and 3*b*, respectively, in a second actuation state.
Figure 3D:
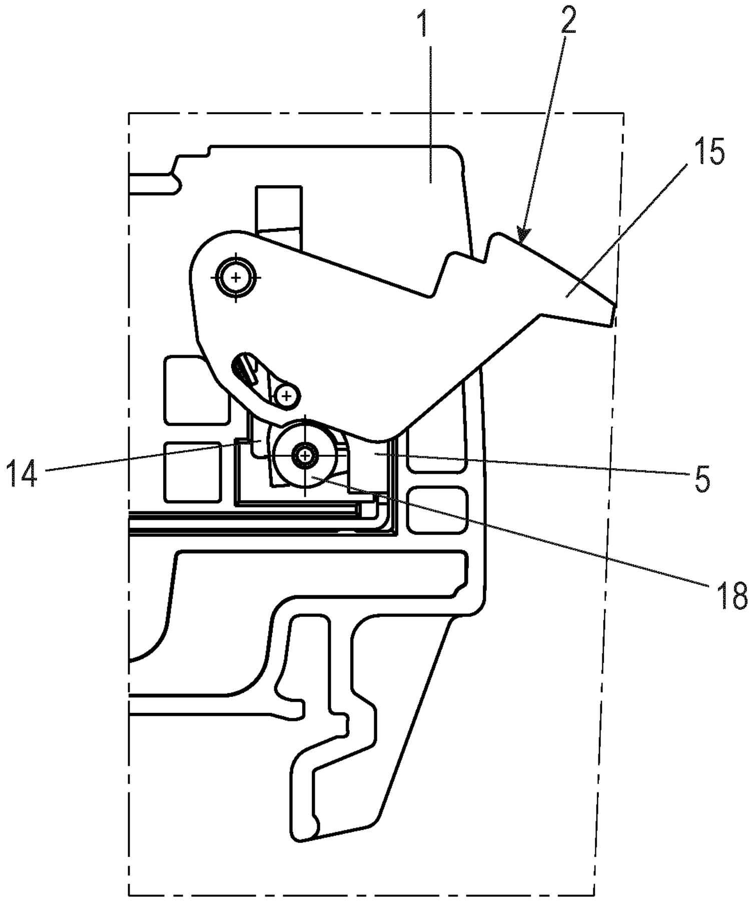
Figure 4A:
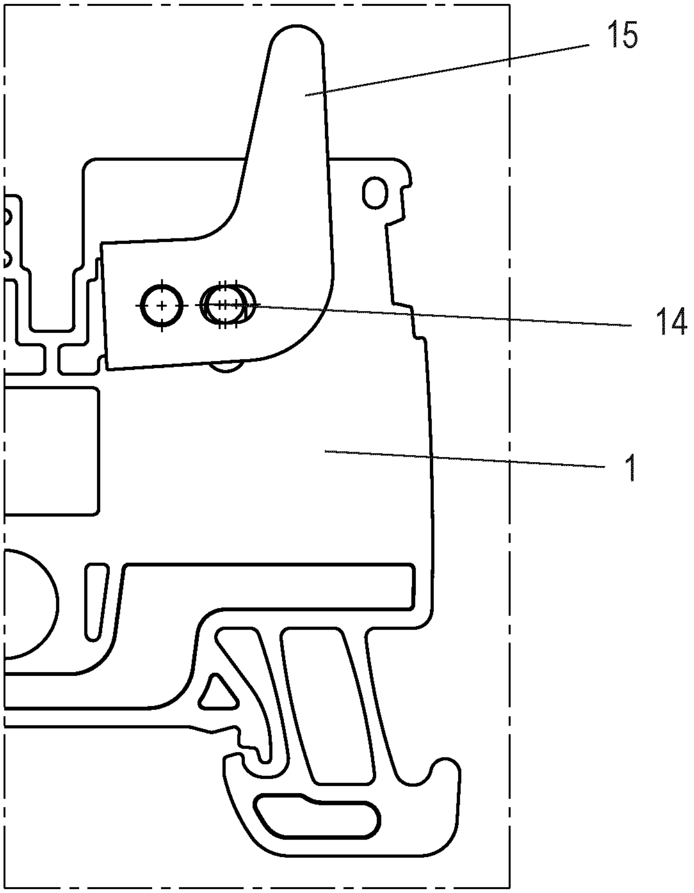
FIGS. 4*a* and 4*b* are a side view and a perspective view, respectively, of a partial region of a third terminal block with a third embodiment of a connection terminal which is formed as a direct plug-in terminal in a clamping state
Figure 4B:
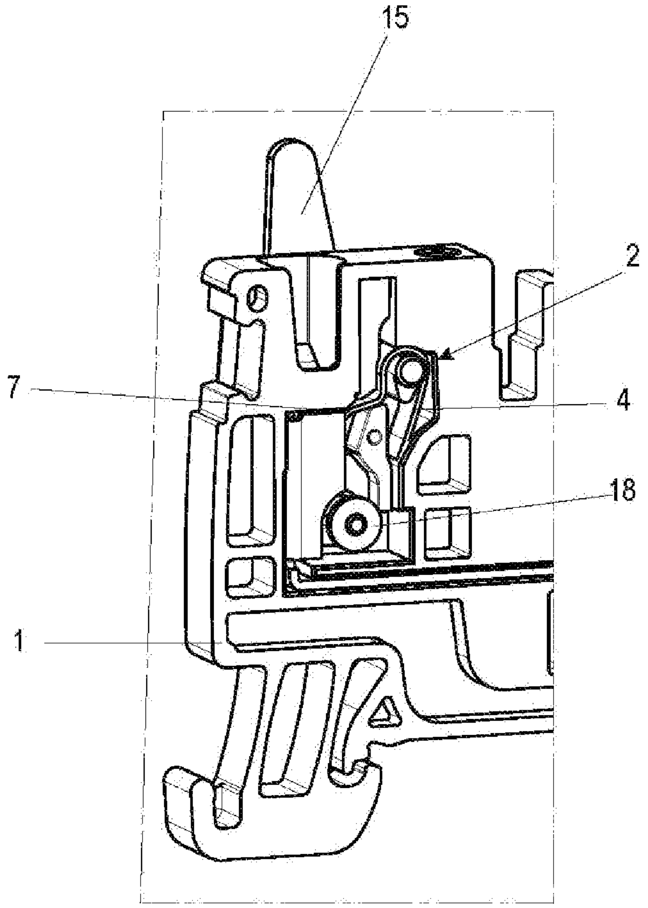
Figure 4C:
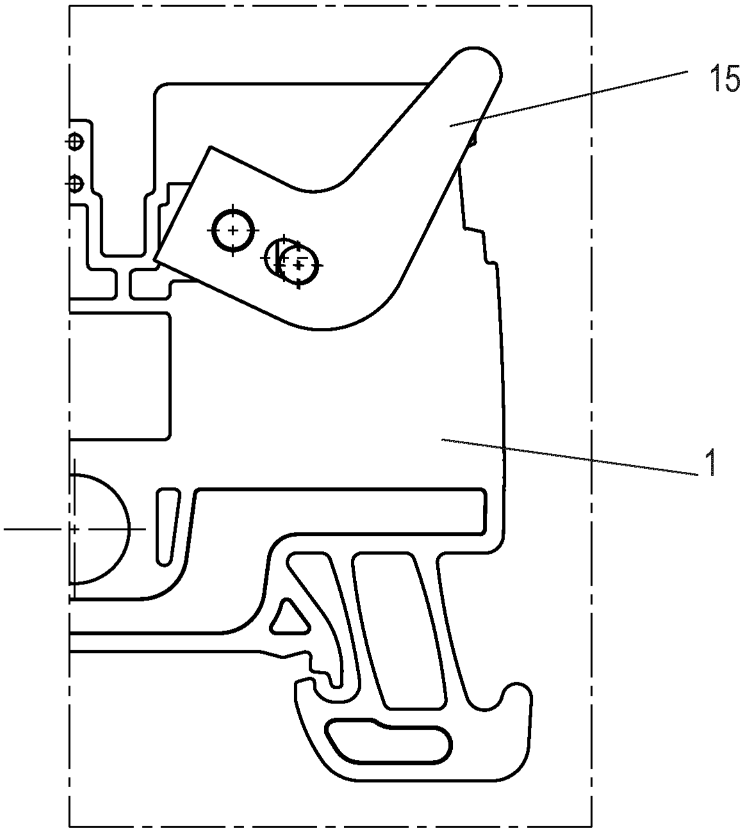
FIGS. 4*c* and 4*d* are corresponding views of the terminal block of FIGS. 4*a* and 4*b*, respectively, in an open locking state.
Figure 4D:
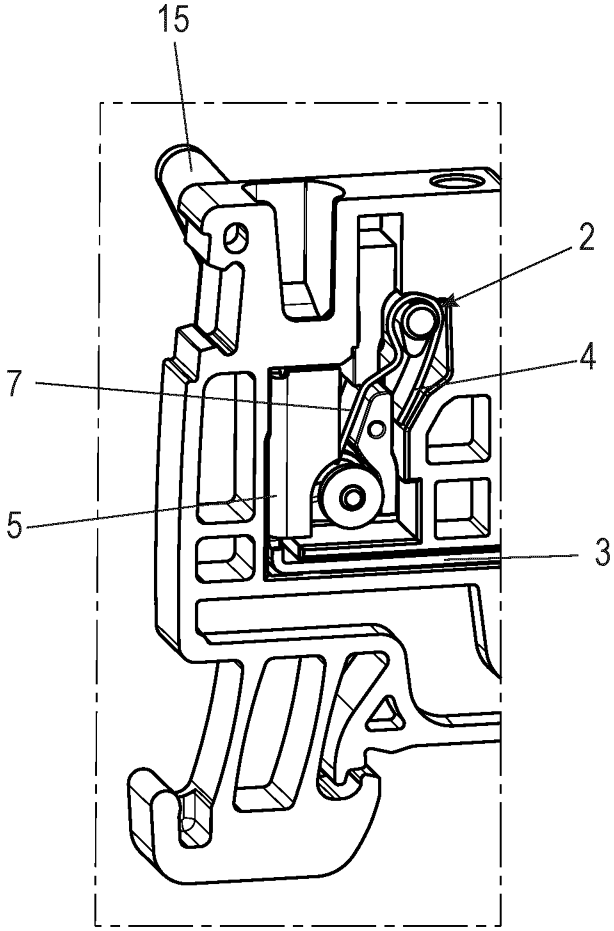

FIGS. 3*a*-3*d* and FIGS. 4*a*-4*d* show various possible configurations of this principle with differently shaped pivoting elements 15, wherein in FIG. 3*a* an actuation to the side of the clamp and in FIGS. 4*a*-4*d* an actuation above the clamp (in relation to a locking foot 23 of the clamp) is possible.

According to FIGS. 1 to 4, the pivoting lever 15 also indicates visually, by the adopted position, whether the respective connection terminal is in an open locking position or in a clamping position.

This is the case only to a limited extent in FIG. 5. This is because, according to FIG. 5, the pivoting element 15 can be pivoted back in the actuation channel after the pressing element 14 has been pressed down, so that it rests externally on the side of the housing 1 and does not protrude too far upwardly or to the side beyond the contours of the housing 1. However, this always results in a visually appealing impression of the housing 1. For visual indication of the switching state, it is possible that the pressing element 14 protrudes from the housing 1, here at the top, in at least one switching state as shown in FIG. 5*e*.

The plug connector can have a plug-in connection 24 for contacting a mating connector, e.g., on the side facing away from the connection terminal 2 as shown in FIG. 5*e*.

Figure 10:
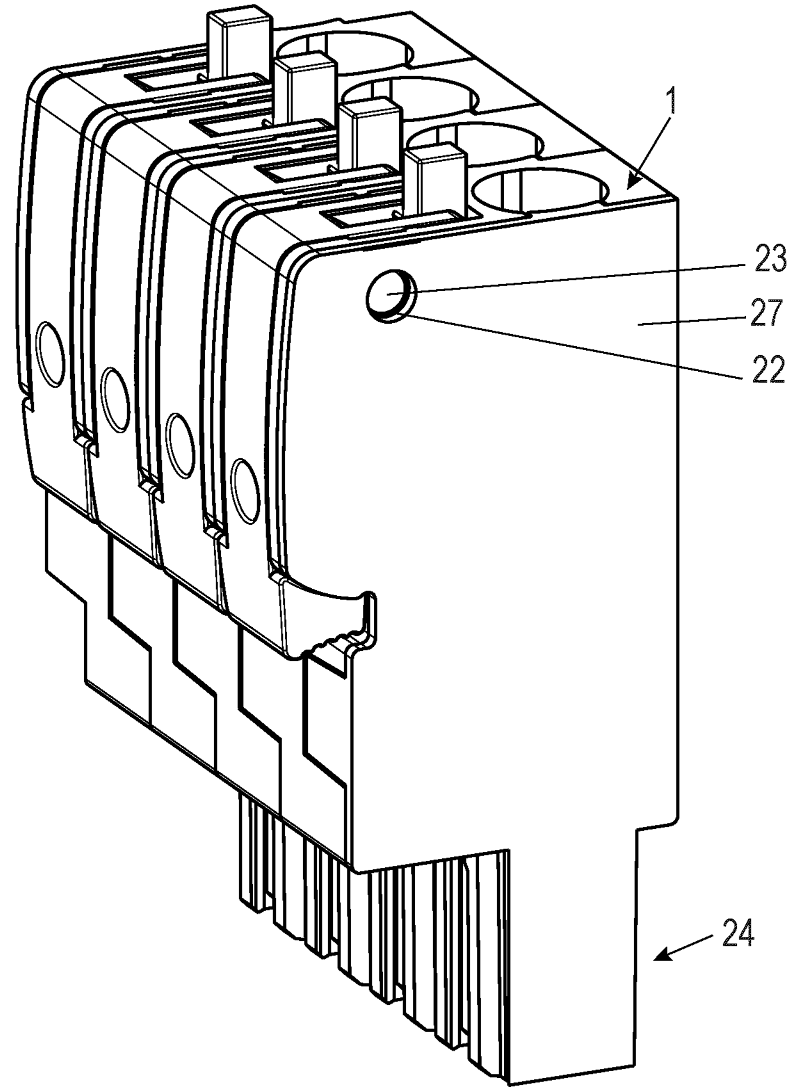
FIG. 10 is a perspective view of a plug-in module including a row of plug connectors.

It is furthermore possible to plug several plug connectors together, in particular on one transverse side, and thus to produce a plug connector arrangement in a disc design as shown in FIG. 10 which also illustrates how the plug connectors (as well as the terminal blocks) can have a rear wall 26, which forms a rear wall 26 of the housing 1. From the other side, recesses are formed in the housing 1 in the manner of mounting contours, so that the structural parts can be mounted from the other side. A cover 27 can also be provided on a single connection terminal or in the direction of a row of connection terminals.

The terminal blocks from FIG. 1 can also be arranged in a row. They also preferably have a substantially continuous rear wall 26.

Furthermore, it is conceivable to place a cover plate on the transverse side of a plug connector, in order to protect the connection device inside the plug connector from external influences and to prevent incorrect plugging of the conductor end.

The invention claimed is:

1. A connection terminal for connecting a conductor, comprising (a) a housing including a busbar, a conductor insertion channel in a rear portion of said housing for receiving the conductor and an actuation channel in a front portion of said housing and which extends parallel to said conductor insertion channel;

(b) a clamping spring arranged in said housing and including a resilient clamping leg movable between an open locking position in which the conductor may be inserted into said conductor insertion channel and a release position in which an end portion of said clamping leg presses the conductor against the busbar at a clamping point;

(c) an actuation mechanism arranged in said housing for moving said clamping spring to the open locking position, said actuation mechanism including a pressing element which is arranged in said actuation channel and movable to press against said clamping leg at the damping point and a pivoting element arranged at least partially within said actuation channel above said pressing element and operable to displace said pressing element downwardly in said actuation channel to move said clamping spring to the open locking position; and (d) a release mechanism arranged in said housing for releasing said clamping spring from the open locking position, said release mechanism being actuated by insertion of the conductor into the conductor insertion channel.

2. The connection terminal as defined in claim 1, wherein said pressing element can be locked in a locking position in which it holds said clamping leg in the open locking position for insertion of the conductor.

3. The connection terminal as defined in claim 1, wherein said clamping spring is supported within said housing and said busbar is configured with a flat surface in a region of said conductor insertion channel, the conductor being guided through said housing and said clamping spring when it is inserted into the clamping point.

4. The connection terminal as defined in claim 1, wherein said clamping spring is not connected to said busbar.

5. The connection terminal as defined in claim 1, wherein said pivoting element is formed as a pivoting lever which is pivotably mounted on said housing and which has a pressing arm which acts on said pressing element and an actuating arm for actuation.

6. The connection terminal as defined in claim 5, wherein said pressing arm rests freely on said actuating arm to enable said pivoting lever to press said pressing element into the open locking position, whereby said pressing element does not also move back with said pivoting lever.

7. The connection terminal as defined in claim 6, wherein said pivoting lever is coupled to said pressing element via a coupling device.

8. The connection terminal as defined in claim 1, wherein said pivoting element is pivotably mounted in said actuation channel.

9. The connection terminal as defined in claim 1, wherein said pivoting element rests substantially externally on said housing.

10. The connection terminal as defined in claim 9, wherein said pivoting element is further pivotably mounted externally on said housing.

11. The connection terminal as defined in claim 1, wherein said housing includes a pivot bearing, said pivoting element being pivotably mounted on said pivot bearing with a fixed axis of rotation.

12. The connection terminal as defined in claim 1, wherein said housing includes a pivot bearing, said pivoting element being pivotably mounted on said pivot bearing with an axis of rotation that moves in a translatory manner in space.

13. The connection terminal as defined in claim 1, wherein at least one of said pivoting element and said pressing element is formed as an optical indication element to visually indicate whether said clamping leg of said clamping spring is in the open locking position or in the release clamping position.

14. The connection terminal as defined in claim 1, wherein said pressing element is formed as a further release mechanism.

15. A terminal block having at least one connection terminal as defined in claim 1.

16. A plug connector including a plurality of connection terminals as defined in claim 1, said connection terminals being configured, arranged in a row, and assembled to form a composite.

17. The plug connector as defined in claim 16, wherein said connection terminals are at least one of positively, non-positively and materially connected.

18. The plug connector as defined in claim 17, Wherein said connection terminals are locked onto one another in the row direction.

19. The plug connector as defined in claim 17, wherein at least one of said connection terminals includes a lateral cover in the row direction.

* * * * *